Aug. 3, 1943.   LE ROY J. LEISHMAN   2,325,864
MEANS FOR TURNING CONTROL SHAFTS TO PRE-SELECTED ANGULAR POSITIONS
Filed Dec. 15, 1937   4 Sheets-Sheet 3

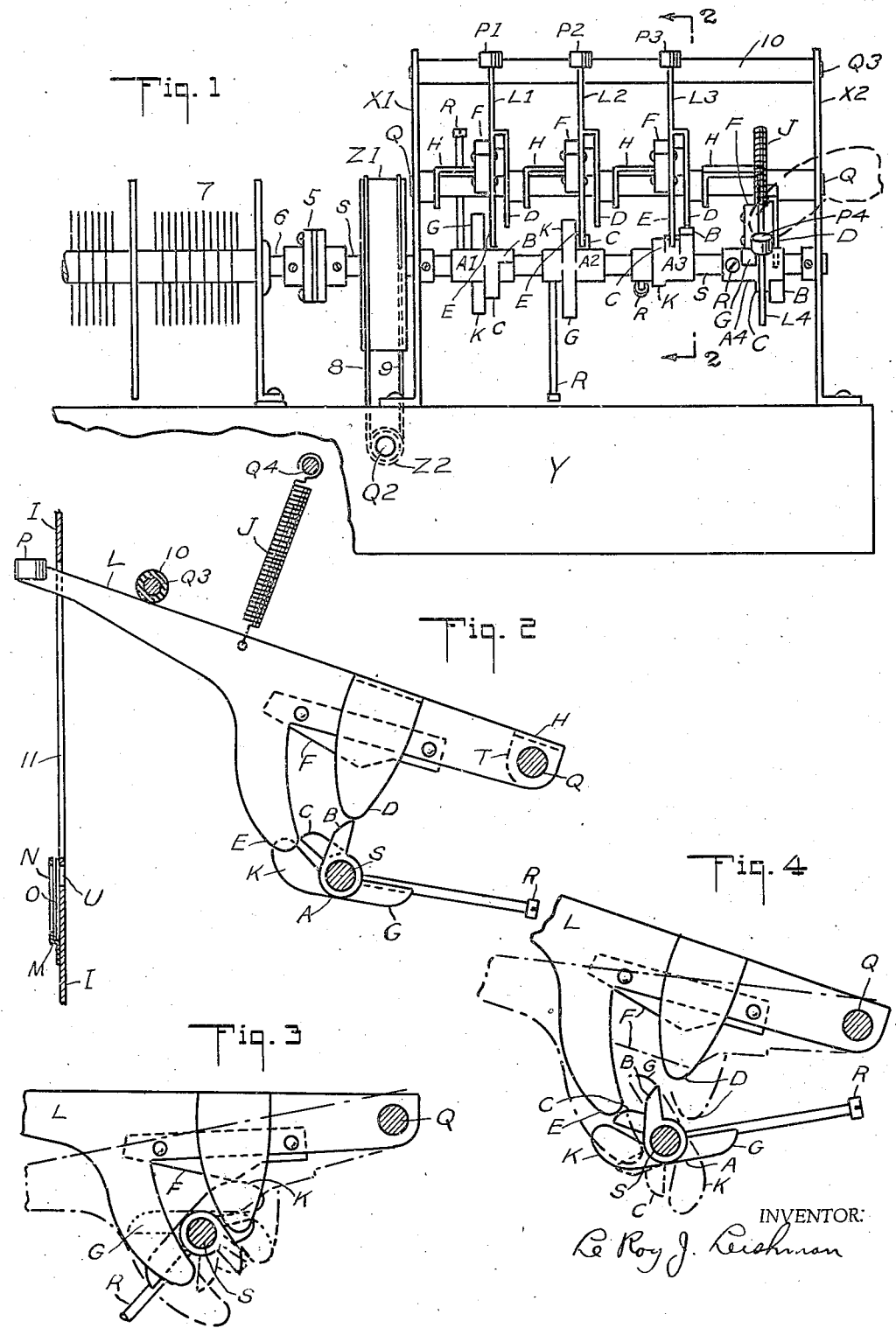

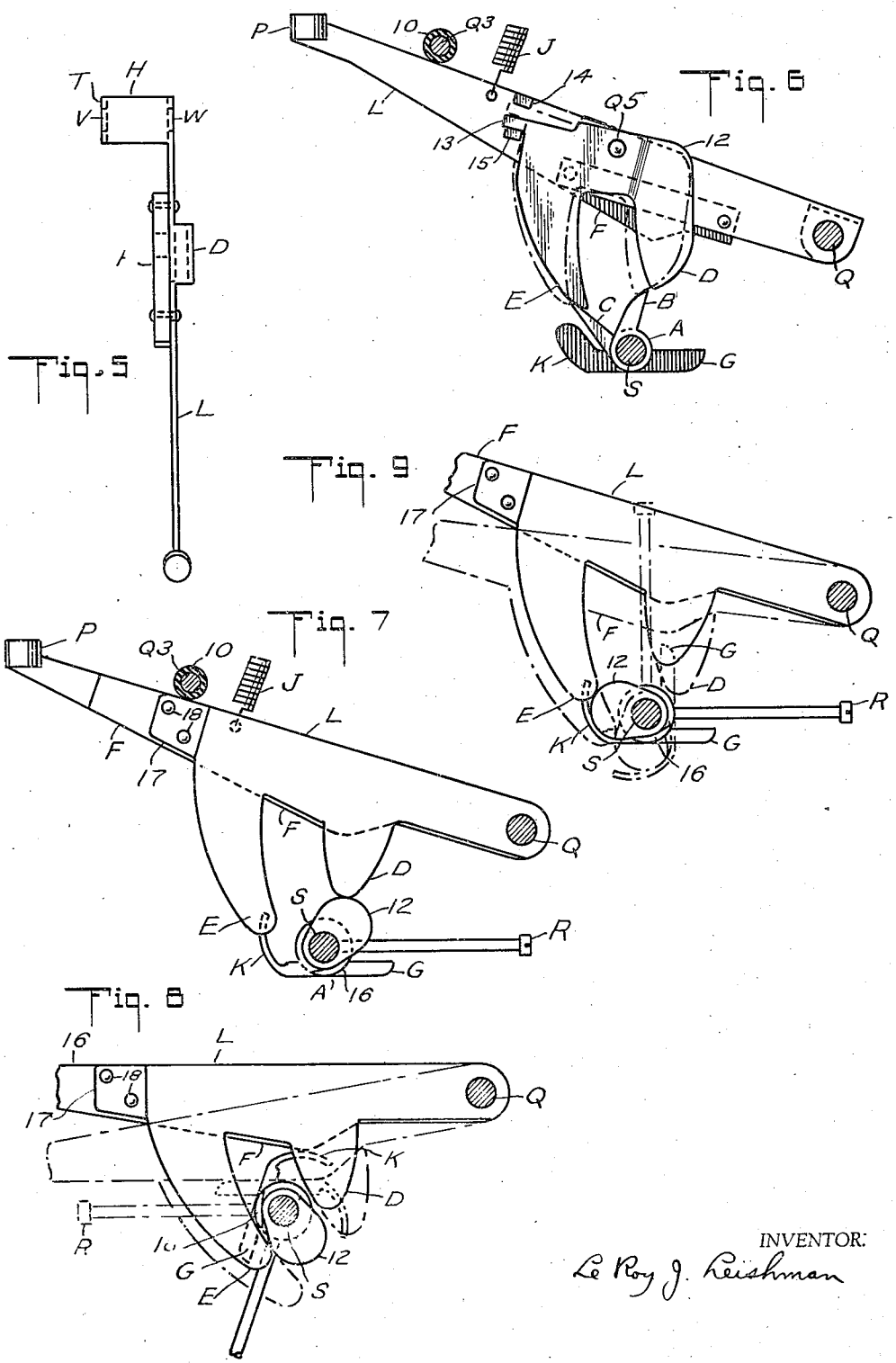

INVENTOR:
Le Roy J. Leishman

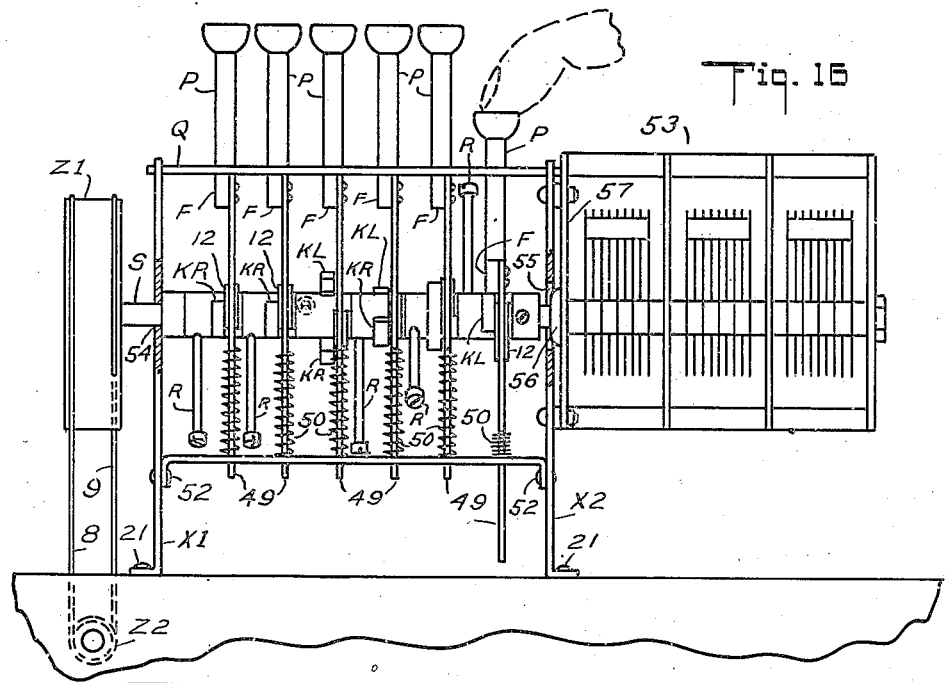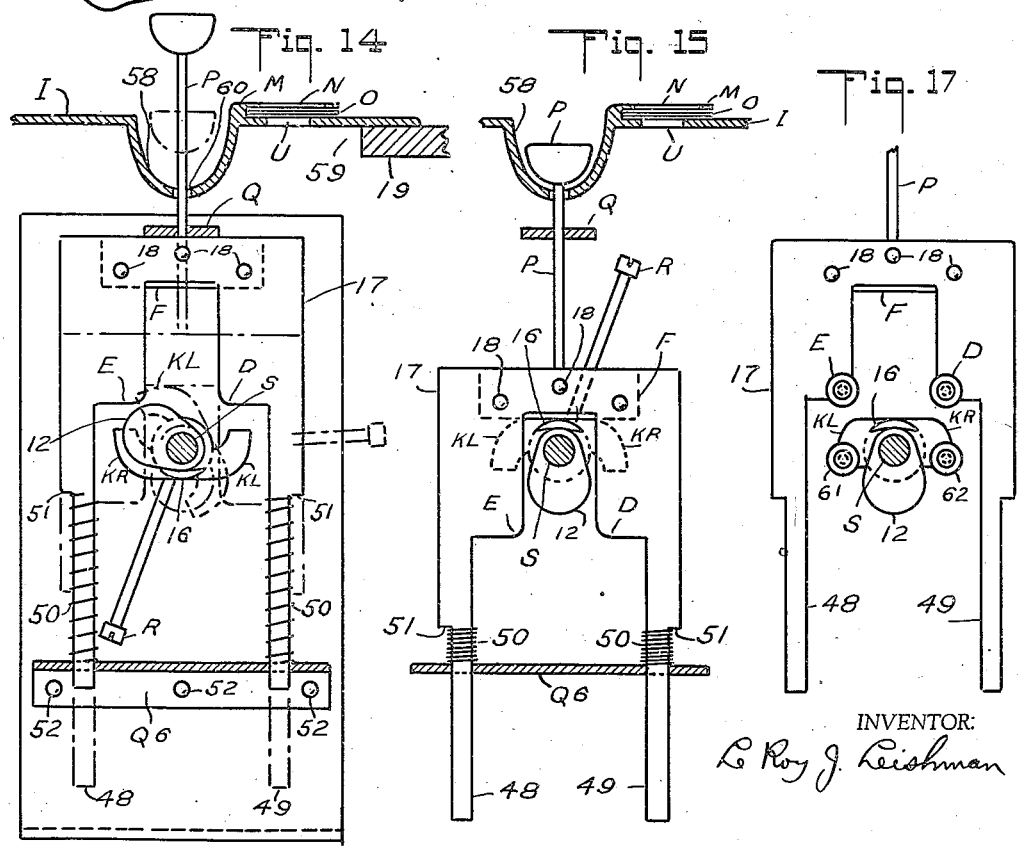

Patented Aug. 3, 1943

2,325,864

UNITED STATES PATENT OFFICE 2,325,864

MEANS FOR TURNING CONTROL SHAFTS TO PRESELECTED ANGULAR POSITIONS

Le Roy J. Leishman, Los Angeles, Calif.

Application December 15, 1937, Serial No. 179,910

20 Claims. (Cl. 74—10)

This invention relates to automatic shaft-positioning means, and more particularly to mechanisms suitable for turning the controls of radio apparatus to predetermined angular positions. Most instruments for varying the impedance of the circuits of a radio set are equipped with rotatable control shafts, and gang condensers, which are most commonly used for this purpose, ordinarily have rotors that need to be turned through an angle of 180 degrees to cover the capacitive range. Various types of automatic tuners have been devised to rotate and stop these shafts at the positions required to tune in pre-selected stations; and those that have been manually operated, or controlled by levers, have usually been equipped with a plurality of selectively operable means each adapted to rotate the control shaft to a different predetermined angular position. Heretofore, however, the manually operable means, or levers, have never been capable of directly rotating the shaft through an angle of 180 degrees in either direction. It has therefore been necessary to confine the use of the levers to stations in a given frequency range, as in the tuner of Bird, Patent No. 1,925,651; or to sacrifice a few degrees of rotation, as has been done with the heart-shaped cam tuners of the past; or to increase the rotation by means of gears or pulleys, as in the device of Schaefer, Patent No. 1,906,106, or my own device, Patent No. 2,084,851. Heart-shaped cam tuners have had the additional defect of requiring too much pressure to operate the levers, due to the extremely short moment arms involved and the inherent inefficiency of cams as a means of transmitting motion when operated by the follower. The objects of the present invention are to increase the angular movement of the rotatable member in tuners of the type described; to provide a mechanical tuner in which the levers or push buttons will rotate a tuning condenser through an angle of 180 degrees in either direction without the use of gears; to supply an operating means that moves in a straight line; to achieve the above objectives through rotatable members that have long moment arms; to furnish a dial transmission that operates very easily; and to make it possible to assemble much of the mechanism directly on the condenser shaft in order to simplify the construction, attain a high degree of accuracy, and reduce the cost. Still other objects will appear as the description proceeds.

In the accompanying drawings:

Fig. 1 is a front elevation of a lever-operated tuning mechanism, shown connected to the rotor of a condenser and to the manual control shaft.

Fig. 2 is a cross section taken on line 2—2 of Fig. 1, showing one lever assembly and the associated rotatable member, together with the escutcheon through which the lever protrudes on the front of the set.

Fig. 3 shows the mechanism of Fig. 2 in a clockwise transitory, and in the tuned-in, position.

Fig. 4 shows the same mechanism about to turn the rotatable member counterclockwise, and as it appears in a counterclockwise transitory position.

Fig. 5 is a plan view of the lever shown in the foregoing figures.

Fig. 6 shows a modification in which the rotatable member may be turned 180 degrees in either direction through the use of a lost-motion link on the lever-assembly.

Fig. 7 shows a modification using a lost-motion link on the control shaft, and the rotatable member is shown in the furthest counterclockwise position—i. e., in the position from which it can only move in a clockwise direction.

Fig. 8 shows the mechanism of Fig. 7 in a transitory position as the rotatable member is being turned clockwise, and, in dotted lines, the tuned-in position.

Fig. 9 shows the mechanism of the last two figures with the rotatable positionable member in the furthest clockwise position as it is about to be turned counterclockwise, and the dotted lines indicate a transitory position in the counterclockwise rotation.

Fig. 14 shows a modification in which the operating means, or plunger, moves in a straight line, and in which a lost-motion link is mounted on the rotatable control shaft. The rotatable parts are shown 180 degrees from the tuned-in position, and, in dotted lines, in an intermediate position.

Fig. 15 shows the mechanism of Fig. 14 in the tuned-in position.

Fig. 16 is a front elevation of a push-button operated mechanical tuner in which the positionable means are mounted on the condenser shaft.

Fig. 17 shows a modification of the mechanism of Figs. 14 and 15 in which friction is somewhat lessened by means of rollers that are also applicable to the forms of the invention illustrated in the other preceding figures.

Figure 11:
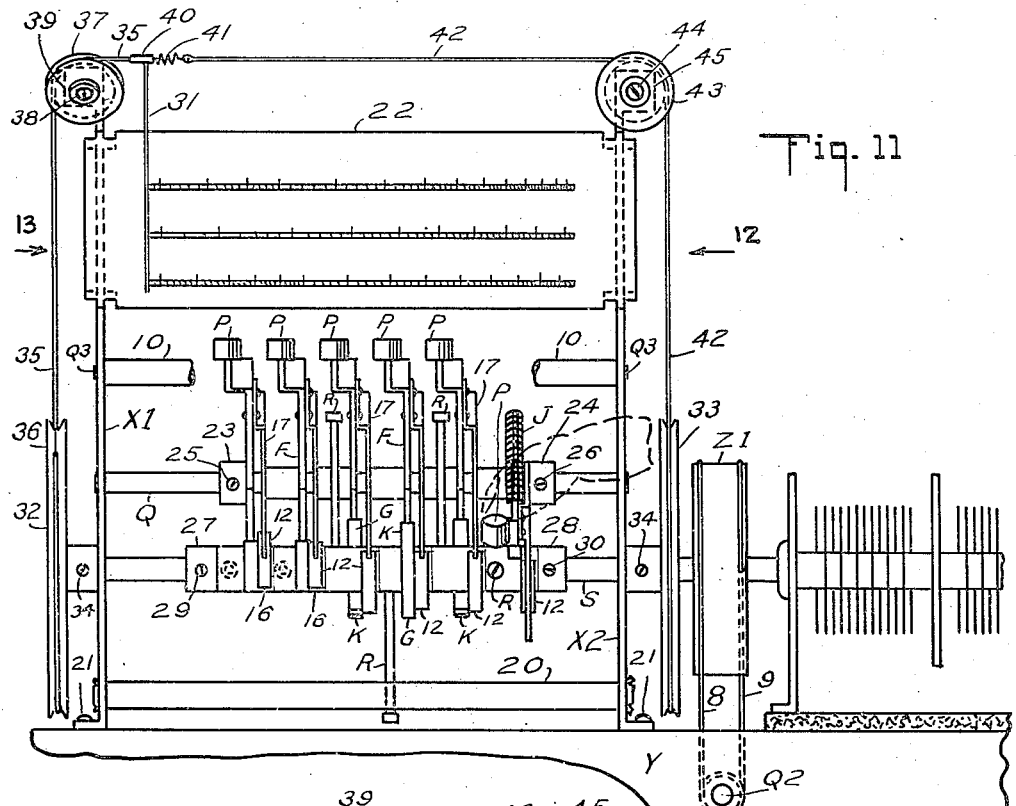
Fig. 11 is a front elevation of an automatic tuner and scale, showing a plurality of operating levers and positioning means of the type illustrated in Figs. 7, 8 and 9, with the latter mounted on the condenser shaft.

It has heretofore been impossible in lever-operated automatic tuners to use identical positionable members for all the levers and yet secure an angular rotation of 180 degrees in either direction upon operation of one of the levers.

This difficulty arises from the fact that when a positionable member is in an extreme angular position 180 degrees from the tuned-in position, the extreme position is the same regardless of the direction in which the member turned in reaching that extremity of its motion. Whether it should be turned to the right or left, the operating means therefore finds the positionable member in identically the same position, which thus becomes a dead end position. When heart-shaped cams are used as the positionable members, each cam can therefore be permitted to turn to the right or left only to such a position as will enable the roller to engage either the right or left edge. In addition to sacrificing these few degrees of rotation that the condenser ordinarily requires, the contour of heart-shaped cams is such that they are very hard to turn, a defect that is complicated by extremely short moment arms with respect to the force applied by the operating lever.

Short moment arms are unavoidable if the operating means has only a single roller or contact projection for urging the positionable member in either direction.

Figs. 1 to 5 illustrate an arrangement in which the difficulties of unsatisfactory contours and short moment arms are both eliminated by the provision of multiple contact projections that move in different planes. Projection D on the operating lever L, pivoted on rod Q, moves in the same plane as arm B of the positionable member A mounted on shaft S, and its function is to move the positionable member through part of its clockwise movement. Projection E on the operating means L moves in the same plane as arm C on the positionable member, and engages arm C during the first part of the counterclockwise movement of the positionable member. Positioning member F, riveted, or otherwise attached, to the operating means L, moves in the same plane as arms G and K of the positionable member, and engages either arm G for the final part of the counterclockwise rotation of member A, or arm K for turning member A through the last part of its clockwise rotation.

In Fig. 2, the positionable member is shown in its extreme counterclockwise position, and the downward movement of operating means L must therefore turn it in a clockwise direction. Positionable member A3, Fig. 1, is shown in this same position, as Fig. 2 is substantially a sectional view taken on line 2—2 of Fig. 1, with escutcheon I added. When button P, Fig. 2, is pressed down, projection D engages arm B and rotates the positionable member in a clockwise direction until it almost reaches the position shown in full lines in Fig. 3. The inner edges of projections E and D are shaped so that they will pass over the center portion of member A and beyond shaft S. Positioning means F now engages arm K of member A and rotates the member until further movement is stopped by the collision of arm G with member F. The lever and positionable member are now in the tuned-in position indicated in dotted lines in Fig. 3, and the rotatable member has been rotated substantially 170 degrees.

Fig. 4 shows positionable member A in the extreme position that it may occupy after the clockwise rotation of shaft S on which the member is mounted. It will be observed that this angular position of the positionable member is about 20 degrees from the extreme counterclockwise position pictured in Fig. 2, and that the two extreme positions are prevented from coinciding by projection E. Each extreme position is thus about 10 degrees from a mean position. In this extreme clockwise position of member A, the downward movement of lever L causes projection E to engage arm C and rotate the member to the position indicated in dotted lines. The continued downward movement of operating means L causes positioning member F to engage arm G of the positionable member and rotate it until further movement is stopped by the engagement of positioning member F with arm K on the opposite side of the shaft or fulcrum from arm G. This is the tuned-in position shown in dotted lines in Fig. 3, and represents a rotation of 170 degrees in a counterclockwise direction from the initial position pictured in Fig. 4.

Fig. 5 is a plan view of lever L, showing projection D, member F, and the end H, which is formed so that the outer portion T is parallel to the plane of the main body of the lever. The turned end T and the end of the lever proper have holes V and W respectively for pivoting the lever on rod Q.

In Fig. 1, a plurality of positioning means L1 to L4 are shown pivoted on rod Q, attached to the two parallel end-plates X1 and X2. A plurality of positionable members A1 to A4, cooperating respectively with positioning means L1 to L4, are mounted on shaft S, journaled in the two end-plates, which are attached to the chassis Y. Positionable member A3 is pictured in the position of member A in Fig. 2, and member A4 is shown turned to the tuned-in position by the action of lever L4, pressed down by the operator's finger, indicated in dotted lines.

A bumper 10 of resilient material extends from one end-plate to the other to limit the upward motion of the operating means or levers. In the form shown, this is a tube, preferably of rubber, surrounding a rod Q3. Each positioning means is held against this bumper by a spring J, Fig. 2, attached to support Q4. This support and the springs for levers L1, L2 and L3 have been omitted from Fig. 1 for the sake of clearness.

Any desired number of levers and cooperating positionable members may be used, but the preference of most engineers seems to range from six to fifteen.

A pulley Z1 is mounted on shaft S, operatively connected by cords 8 and 9 to pulley Z2, on which the other ends of these cords are reeled. Pulley Z2 is keyed to shaft Q2, to which the operating knob, not shown, is attached. Coupling 5 connects shaft S to shaft 6 on which the rotor plates 7 of the condenser are mounted.

The levers ordinarily protrude through slots in an escutcheon on the front of the set, as indicated in Fig. 2, where lever L is shown passing through slot 11 in escutcheon I. Beneath each lever may be placed an index tab O, held in position by a holder M extending across the escutcheon under all the slots. Each tab O is visible through a window N in the holder.

Each positionable member may be set, or adjusted, so that the operation of the associated positioning means will tune in a pre-selected station. This is done in the following manner: The index tab O is first removed. Lever L is then pressed all the way down, thus rotating the positionable member to the tuned-in position and bringing the set-screw R directly behind hole U in the escutcheon. While the lever is held down, the set-screw is loosened by means of a screwdriver inserted through window N and hole U.

The desired station is then tuned-in by the manual knob that rotates shaft Q2. After this has been done very carefully, the set-screw is again tightened, the lever allowed to flip back to its rest position against bumper 10, and an index tab, bearing the station call-letters, is placed in the proper recess between the holder M and the escutcheon. Any subsequent complete downward movement of the operating means, or lever, will return the positionable member to this same angular position and thus tune in the same station.

Although the mechanism just explained, like those using heart-shaped cams, fails by a few degrees to turn the control shaft through the 180 degree angle required by the usual type of condenser, it is much easier to operate, due to the fact that the positionable member in every possible position has a longer moment arm with respect to the force applied by the operating lever than does a heart-shaped cam. This is because the pressure to a heart-shaped cam is always applied from the same point on the positioning means, regardless of the direction of rotation; but in the mechanism of the preceding figures, greater leverage is provided through the use of separate arms and different points of lever contact for each direction of rotation.

Fig. 6 illustrates a novel arrangement that makes it possible for the positioning means to rotate the positionable member through an arc of 180 degrees in either direction. This is achieved through the use of the lost-motion member 12, forming the contact projections D and E. Member 12 is shaped so that projection D lies in a different plane than the rest of the member. The lost-motion link 12 is pivoted on stud Q5 on lever L, and has a projecting tappet 13, adapted to engage the motion-limiting abutments 14 and 15 on lever L. As in the preceding figures, arms B and C move in the same planes as projections D and E respectively, and arms G and K are in the plane of positioning member F. When the positionable member approaches its extreme clockwise position, arm C engages projection E, and arm B engages projection D, thus moving the lost-motion member to the position shown in full lines in the figure. When button P is pressed down, projection E engages arm C and rotates the positionable member counterclockwise until arm G is in a position to be engaged by the positioning member F, which turns the positionable member to the tuned-in position as in the preceding figures.

If shaft S turns the positionable member counterclockwise, arms C and B will engage their cooperating contact projections and turn member 12 to the position indicated in dotted lines. It will now be seen that the downward movement of the operating lever will turn the positionable member in a clockwise direction until arm K is ready to be engaged by positioning member F, which rotates member A to the tuned-in position 180 degrees from the position shown in the figure.

In this modification, each positionable member of course has a setscrew, but this not shown in Fig. 6, as the set-screw provision involves no departure from the form illustrated in preceding figures. A complete tuning device will embody a plurality of operating means and cooperating positionable members assembled substantially as shown in Fig. 1.

Figures 7 to 13 illustrate the preferred embodiment of the invention. In this modification, the desired rotation of 180 degrees in either direction is accomplished by a lost-motion link, as in the embodiment of Fig. 6, but in this case the link is on the rotatable member. The contact projections E and D, unlike those in any of the previous figures, are both in the same plane. Member 17, of which projections E and D are a part, is offset at one end, as clearly shown in Fig. 10, to permit attachment to member F by rivets 18 or other suitable means. Members F and 17 have holes W and V respectively at the end of the operating means opposite to that carrying button P. These holes are for shaft Q, as indicated in the other figures of this group. Positionable member A embraces arms G and K, shaped substantially as in the foregoing figures, and is also provided, as in the other modifications, with a set-screw R in the hub, Fig. 11. Member A has a tappet projection 16, Figs. 7, 8, 9 and 11, which extends transversely from the main body of the member in a direction parallel to the shaft on which the member is mounted. This tappet is adapted to limit the rotation of lost-motion link 12 in either direction with respect to member A. Link 12 is free to turn on shaft S excepting when in contact with tappet 16, in which case link 12 and member A turn as a unit. Tappet projection 16 should preferably extend slightly beyond link 12, in order that the projection may abut against the next positionable member that may be assembled on shaft S, permitting link 12 to turn freely without any unnecessary friction on the sides.

In Fig. 7, the positionable member A is shown in the extreme counterclockwise position. Link 12 is in engagement with projection D and with tappet 16 on the positionable member. When the operating means is pressed down, the pressure of contact projection D is transmitted by the link to the tappet, and member A is therefore rotated until the link lies between the two contact projections. The link is shown in this position in full lines in Fig. 8. As the positionable member is pictured here, arm K has already been engaged by positioning member F, but the link itself remains in the position to which it was urged by projection D. The positionable member is now turned to the final tuned-in position, shown in dotted lines, by the action of member F, as in the modifications already described.

A positionable member in the extreme clockwise position is shown in full lines in Fig. 9. In this case, the initial turn is given by contact projection E, which presses on link 12; and the link, being in engagement with tappet 16, rotates the member until arm G is in position to be turned by positioning member F. The dotted-line view in Fig. 9 shows the link and positionable member still turning as a unit under the pressure of projection E, just before arm G has moved under positioning member F, which then turns the positionable member to the tuned-in position as explained in connection with modifications previously described. The link, however, is free from engagement with the positionable member as soon as arm G receives the pressure of positioning element F, and it then hangs loosely on the shaft between the projections.

In a complete tuner using this mechanism, a plurality of positionable members with accompanying links are assembled on shaft S as indicated in Fig. 11. A plurality of operating means are pivoted on rod Q, and normally held against bumper 10 by individual springs J, all but one of which are omitted from the figure to avoid obscuring other details. Bumper 10 is pictured as a tube on rod Q6 extending, like rod Q, from end-plate X1 to end-plate X2. These rods may be made to serve the additional function of assisting bar 20 to support the frame. Shaft S, as in Fig. 1, is journaled in the end-plates. The tuner is mounted on chassis Y by means of screws 21. In the tuning device pictured in Fig. 11, the end-plates also support tuning scale 22. If provisions are made for the automatic tuning of only a few stations, the scale is apt to extend beyond the operating means. If it is desired to arrange them symmetrically with respect to the tuning scale, the operating means may be centered between two collars 23 and 24, fastened on shaft Q by means of screws 25 and 26 respectively. The positionable members are pictured similarly centered between collars 27 and 28, having set-screws 29 and 30 respectively.

Figures 12, 13:
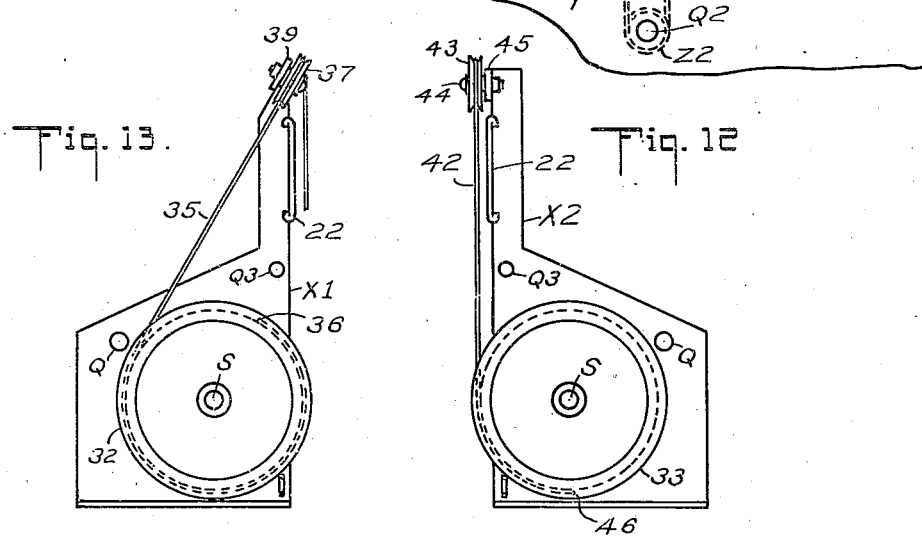
Fig. 12 is a side elevation of the right end of the tuner depicted in Fig. 11, showing features of the dial transmission.
Fig. 13 is a side elevation of the left end of the device of Fig. 11, showing details of the drive to the horizontal dial.
Figure 10:
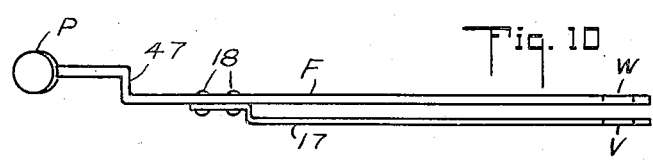
Fig. 10 is a plan view of the lever used in the device of Figs. 7, 8 and 9.

The horizontal tuning scale 22 has a movable pointer 31, which must be moved across the scale by the rotation of tuning shaft S. This is accomplished by a simple novel drive that adds very little to the torque required to turn this shaft. In the usual drive to a tuning scale, only one pulley is used on the driving shaft, and the cord is made to double back so that both ends may be fastened to the driving pulley. This requires that the cord pass around an extra idler pulley, and the doubling back has a snubbing action that materially adds to the load. The drive shown in Figs. 11, 12 and 13, however, is extremely easy to operate. Two pulleys 32 and 33 are keyed to shaft S on opposite sides of the assembly by screws or pins 34. A cord 35, fastened to pulley 32 at point 36, passes down around this pulley and then around idler pulley 37, turning on stud 38 on bracket 39, which is integral with end-plate X1. Bracket 39 is formed at an angle that will permit cord 35 to remain in the same plane until it passes beyond pulley 37, as shown in Fig. 13. Cord 35 is fastened to the mounting 40 of pointer 31. A spring 41 is fastened to the other side of the mounting, and to cord 42, which passes around idler pulley 43 turning on stud 44 in bracket 45, formed on end-plate X2. As pictured in Fig. 12, pulley 43 lies in a vertical plane, permitting cord 42 to pass directly down and around pulley 33, to which it is attached at point 46.

As shown in Fig. 11, the positionable members are mounted directly on a long condenser shaft. Ordinarily, difficulty would arise in aligning the bearings for this shaft, inasmuch as the condenser usually has an independent mounting; but in the arrangement shown in the figure, this difficulty is avoided by supporting the condenser on rubber, an expedient often used to reduce microphonic effects. Such a rubber support, however, must have sufficient rigidity to keep the condenser on even keel.

Pulleys Z1 and Z2 are for the manual drive, and function as do the corresponding pulleys in Fig. 1.

In the embodiment of the invention just explained, the positionable members are set in the same manner as those shown in Figs. 1 to 4. However, the arrangement of the set-screw R with relation to the operating button P is improved, as the positioning member is offset at 47, Fig. 10, so that the set-screw comes directly under the corresponding button P, as shown in Fig. 11.

Figs. 14, 15 and 16 illustrate a modification in which the operating means moves in a straight line, rather than in an arc as in the previously described embodiments. This modification is applicable to any of the mechanisms shown in the preceding figures, but the configuration of the cooperating parts must be altered somewhat. The type of positionable member pictured in the drawings is that shown in Figs. 7, 8 and 9, but inasmuch as the positioning element F moves directly down on the positionable member, thus engaging either arm KR or KL at the same angle, both of these arms have the same contour. The tappet and lost-motion link shown are identical to those previously described. The curved contact surfaces D and E have the same function as the parts bearing the same reference letters in other figures, and the mechanism operates substantially the same as the mechanisms of the other embodiments. In this form of the device, the positioning means must have guides to serve the purpose of rod Q in the pivoted type. These guides should be located as far apart as possible in order to reduce play to a minimum and prevent binding. Guide bar Q extends all the way across the device from end-plate X1 to end-plate X2, Fig. 16, and is apertured to form bearings or guides for the plungers P. Member 17, on which contacts E and D are formed, terminates in end pieces 48 and 49, passing through holes in guide member Q6. Each of these end bars 48 and 49 is surrounded by a spring, abutting against member Q6 and pressing against shoulder 51, thus forcing the operating means upward until the top edges of members F and 17 rest against member Q.

If plunger P, Fig. 14, is pressed down on a positionable member and lost-motion link occupying the extreme clockwise position shown in full lines, the curved contact portion E will engage link 12, resting on tappet 16; and when the button on the plunger occupies the position indicated in dotted lines, the positionable member will have been moved to the dotted line position with positioning element F pressing on arm KL, and the further downward movement of the operating means will rotate the positionable member to the left until the operating means and positionable member occupy the tuned-in position pictured in Fig. 15.

The manner in which the operating means turns the positionable member to the right, or in a clockwise direction, will be evident from the description of the preceding figures.

In the plunger, or push-button, -operated tuner illustrated in Fig. 16, a plurality of positionable members are mounted directly on the shaft S of condenser 53, shown diagrammatically. Shaft S has a bearing at 54 in end-plate X1, but end-plate X2 has an aperture 55 much larger than the shaft, and, in some assemblies, even larger than the drawn-portion 56 that houses the customary ball-race that forms one bearing for the condenser shaft in the condenser end-plate 57, shown bolted to end-plate X2 of the tuner. Pulleys Z1 and Z2 belong to the type of manual drive described in connection with Fig. 1.

As shown in Fig. 14, it is possible to draw the escutcheon I, as indicated at 58, so that the operating button, in its downward stroke, may pass beneath the plane of the escutcheon, as shown in Fig. 15, thus reducing the amount that the plungers extend above the top of the set. Escutcheon I is shown resting on one edge 19 of an opening 59 in the top panel of the set, and the escutcheon has an aperture 60 at the bottom of the drawn section to permit the plunger to pass through. The escutcheon extends, of course, across the entire automatic tuning device, and the long trough 58 has an aperture at the bottom for each of the plungers. The escutcheon also carries an index-tab holder M, extending along the edge of the drawn section, and having a window N substantially adjacent to each plunger through which the station call-letters may be read on the index tab O in the recess between holder M and the escutcheon proper.

The push-button tuner is set in the following manner: Tab O is removed from under the window N by the plunger that is to tune-in the desired station, and the plunger is then pushed all the way down to the position pictured in Fig. 15. This causes set-screw R to come into alignment with hole U in the escutcheon at the bottom of the index-tab compartment. A screw-driver is then inserted through window N and hole U, and the set-screw loosened. While still holding the plunger down, the desired station is tuned-in by the regular manual tuning knob as carefully as possible. The set-screw is then tightened again, and the proper index-tab placed in the holder.

Suppose that the satisfactory operation of the condenser to which the device is attached, requires shaft S to turn through a maximum arc of 70°. Additional rotation of this shaft, let us say, is not necessary either because the condenser is of a type in which the rotor blades can be moved completely in and out of mesh by a movement through a 70° angle, or because the motion is stepped up to 180° by gears, pulleys and a belt, or a motion-multiplying linkage such as that shown in Fig. 2 of the Carlson Patent No. 1,964,449. Suppose one of the positionable members KL—KR is being set so that the operation of its plunger P will move the shaft to the counter-clockwise extreme of its angle of rotation. With set screw R loosened and the plunger held down, the manual knob (not shown) which operates pulley Z2, Fig. 16, is turned until shaft S has been rotated as far as possible to the left. All during this setting operation, the plunger and cam KL—KR will be in the position shown in Fig. 15, but shaft S will turn within the cam. After the shaft has been rotated to its end position in the manner just described, set screw R is tightened. Now suppose another positionable member or cam KL—KR is to be set for the clockwise extreme of the 70° angle of rotation required of shaft S. While the set screw of this second cam remains released with the associated plunger held down, shaft S is rotated to the other extreme of the required 70° angle of rotation, and the set screw is then tightened to lock the cam in its adjusted position on the shaft. The second cam will now be in the position shown in Fig. 15, and the cam that was set for the counter-clockwise extreme of rotation will have moved during this operation to the position shown in broken lines in Fig. 14, but link 12 will remain unengaged and undisturbed in the position shown in broken lines in Fig. 14, which is the same position as that shown in full lines in Fig. 15. Suppose that it is now desired to utilize the tuning mechanism to rotate shaft S to the counter-clockwise extreme automatically. The plunger for the cam that was set for this position will engage the cam as shown in broken lines in Fig. 14 and move it to the position shown in Fig. 15. The second cam that was set will now have moved to the left to a position 70° from its tuned-in position with the end KR elevated above and to the right of shaft S. The link 12 associated with this cam will remain in its hanging position, as the mechanism described and illustrated permits about 80 degrees of movement of any member KL—KR from its tuned-in position before link 12 starts to move. It will be obvious that the plunger for the second adjusted cam may now be depressed and the cam rotated to the clockwise position for which it was set without the link 12 associated with either of the adjusted cams coming into play. Now suppose a third positionable member KL—KR is set for an angular position midway between the two extremes of rotation. When this third cam is in its tuned-in position, end KL of the first adjusted cam will be raised 35° and end KR of the second cam will be raised 35°. If these three cams are set for the angular positions indicated and shaft S is turned to its counter-clockwise extreme, the first cam will be in the tuned-in position illustrated in Fig. 15; end KR of the third cam will be raised 35°; and end KR of the second adjusted cam will be raised 70°. If shaft S is now turned to the clockwise extreme of its required 70° angle of rotation, the second adjusted cam will be in the position shown in Fig. 15; the third adjusted cam will have its KL end raised 35°; and end KL of the first adjusted cam will be elevated 70°. The plungers for these three cams may now be pressed at random to rotate shaft S to any of the three positions for which the positionable members have been set, and although two of these positions are the extremes of the 70° angle of rotation, the links 12 and the associated shoulders E and D never come into engagement. Inasmuch as part 12 and shoulders E and D thus do not come into play within the range of angular movement just described, it is obvious that they are not required in the device when its range is to be within these limits.

Fig. 17 is introduced to illustrate how rollers may be used at the points of contact in any of the embodiments described in this specification and pictured in the drawings. The embodiment shown is the one just described. Rollers E and D are pivoted on studs in member 17, and obviously serve the same purpose as the rounded corners E and D in Figs. 14 and 15. These rollers reduce friction somewhat, but inasmuch as they involve an additional cost for each lever and thus increase the selling price of the set, I prefer instead to use suitable contours on the rounded contact edges and to construct the members from metals that slide with a minimum of friction. Rollers 61 and 62 reduce the rotational resistance of the positionable member when engaged by member F of the operating means. This expedient may be used on any of the various forms of the invention, although proper contours and proper metals usually make rollers unnecessary. Arms G and K, in the different figures, operate very satisfactorily if their contours are substantially as shown.

The condenser shaft, in any of the modifications, may be connected to shaft S by a coupling, as indicated in Fig. 1, or shaft S may be the shaft of the condenser itself; and various ways of mounting the condenser and eliminating extra bearings, of which those shown in Figs. 11 and 16 are typical, may be used interchangeably in any of the embodiments.

Still other modifications will be evident to those skilled in the art, and optional substitutions, additions and omissions may be made without departing from the spirit of the invention, of which the forms shown and described are only typical embodiments.

My claims are:

1. In a mechanism for positioning a control, a combination including: a movable operating means; and a rotatable positionable member comprising four arms each adapted to be engaged by different portions of said means for turning said member each in one direction through a substantially different sector.

2. In a mechanism for angularly positioning a control, a combination including: a movable operating means; and a rotatable positionable member comprising three arms each adapted to be engaged by said operating means and each lying in a different plane.

3. In a mechanism for positioning a control, a combination including: a movable operating member; a rotatable positionable member adapted to be turned to an angular position that is common to either extreme of its rotary motion; and an element for transmitting motion from said operating member to said positionable member and having a lost-motion connection with at least one of said members, said element adapted to assume different positions when said positionable member is in said angular position, the position of said element depending upon which extreme of its motion has been reached by said positionable member.

4. In a mechanism for positioning a control, a combination including: a rotatable positionable structure comprising first, second and third lever arms; and a movable operating device comprising a first contact means adapted to engage said first arm and rotate said structure in one direction, a second contact means adapted to engage said first arm and rotate said structure in an opposite direction, and means for engaging either of the other lever arms and rotating at least part of said structure to a position at which both the second and third arms are simultaneously in engagement with said latter means.

5. In a mechanism for positioning a control, a combination including: a rotatable element; a plurality of rotatable positionable means; and a plurality of independently movable operating means each individual to one of said positionable means; each of said positionable means comprising both a member adjustably mounted on said element and a lost-motion link free to turn around said element, said link adapted to transmit motion from the corresponding operating means to the associated member, and said member having means for preventing side friction from interfering with the free rotation of said link, said latter means comprising a projection extending from said member in a direction parallel to said element and passing at least slightly beyond said link.

6. In a radio control mechanism, a combination including: a rotatable positionable member; positioning means for turning said positionable member in either direction, said means comprising a longitudinally movable operating element having legs adapted to straddle said member; a supporting guide for each of said legs; and at least one supporting guide for said element located on the opposite side of the axis of rotation of said member from said first-mentioned guides.

7. In a radio control mechanism, a combination including: a rotatable shaft; a positionable member adjustably mounted on said shaft; positioning instrumentalities for turning said member in either direction; said instrumentalities comprising a longitudinally movable device having legs adapted to straddle said shaft; said instrumentalities also comprising an element operatively interposed between said device and said member and adapted through a lost-motion connection to transmit motion from said device to said member; and a supporting guide for at least one of said legs.

8. In a radio control mechanism, a combination including: a rotatable shaft; a plurality of positionable members adjustably mounted on said shaft; a plurality of positioning instrumentalities for turning said members and shaft in either direction; each of said instrumentalities comprising a longitudinally movable device having a plurality of supporting guides; each of said instrumentalities also comprising an element free to turn around said shaft and adapted through a lost-motion connection to transmit motion from the associated device to one of said members; and means for preventing side friction from interfering with the free angular movement of said elements.

9. In a radio control mechanism, a combination including: a rotatable shaft; a plurality of positionable members adjustably mounted on said shaft; a plurality of movable operating devices for positioning said members, said devices each having legs adapted to straddle said shaft; a plurality of elements each having a lost-motion connection with at least one of said members and adapted upon movement of one of said devices in one direction to transmit motion from one of the legs of said device to said member for rotating said member in one direction; and means for holding said devices in normally inoperative positions.

10. In a mechanism for positioning a control, a combination including: a movable operating means; a rotatable positionable means; and a member for transmitting motion from said operating means to said positionable means for turning said positionable means from certain angular positions, said member having a lost-motion connection with at least one of said means; said positionable means adapted to be rotated from certain other angular positions by the direct engagement and movement of said operating means.

11. In a mechanism for positioning a control of a radio device, a combination including: a rotatable shaft; a positionable structure adjustably mounted upon said shaft; positioning means for turning said structure in either direction to a position at which said means presses against said structure on opposite sides of its rotational axis in substantially parallel directions; said means having a first shoulder adapted to engage and turn said structure in one direction only and a second shoulder adapted to engage and turn said structure in the opposite direction only, said means having a recess between said shoulders to permit said shoulders to pass over said shaft.

12. In a mechanism for positioning a control, a combination including: a rotatable positionable structure comprising first, second and third arms; and a movable positioning member having a first shoulder adapted to engage said first arm and turn said structure in one direction, and a second shoulder adapted to engage said first arm and turn said structure in an opposite direction; said member also having means for engaging said second and third arms and rotating at least a part of said structure in one direction when the second arm is engaged and in the opposite direction when the third arm is engaged; said member having a recess between said shoulders to receive said first arm when said member is in engagement with either of the other arms.

13. In a radio control device, a combination including: a rotatable structure; and a rectilinearly movable operating device for rotating said structure; said device comprising at least one supporting arm disposed to move in a path at one side of said structure, and a pair of shoulders adapted to engage said structure on opposite sides of the axis of said structure and rotate said structure in respectively opposite directions, one of said shoulders positioned substantially between the other shoulder and said arm.

14. In a mechanism for positioning a control of a radio apparatus, a combination including: a rotatable shaft; a rotatable positionable structure mounted on said shaft; and a rectilinearly movable operating device for rotating said structure in either direction to a position at which said device presses against said structure on both sides of said shaft in substantially parallel directions, said device comprising at least one supporting arm disposed to move in a path lying on one side of said shaft and transverse thereto, and a pair of shoulders adapted to engage said structure on opposite sides of said shaft and rotate said structure in respectively opposite directions only; said device having a recess between said shoulders to permit said shoulders to pass over said shaft.

15. In a radio control mechanism, a combination including: a rotatable positionable member; positioning means for turning said positionable member in either direction, said means comprising a longitudinally movable operating element having legs adapted to straddle said member; supporting and guiding means for said legs; and at least one supporting guide for said element.

16. In a radio control mechanism, a combination including: a rotatable shaft; positioning instrumentalities for turning said shaft in either direction; said instrumentalities comprising a longitudinally movable element having legs adapted to straddle said shaft; supporting and guiding means for said legs; and at least one supporting guide for said element; said instrumentalities also comprising an adjustable member operatively interposed between said element and said shaft for predetermining the angular position to which said shaft will be rotated upon movement of said element in one direction.

17. In a mechanism for positioning a control of a radio device, a combination including: a rotatable positionable member; a movable actuating means comprising a motion-initiating member; and an element adapted to have a lost-motion operating connection with both said actuating means and said positionable member whereby motion may be transmitted from said actuating means to said positionable member upon movement of said motion-initiating member in one direction.

18. A mechanical station selector type tuner for a radio receiver comprising, in combination, an actuator movable generally rectilinearly and having a recess in its forward end bordered by spaced forwardly projecting portions on opposite sides thereof, a rotatable positionable structure positioned in front of said actuator and comprising an elongated generally flat peripheral cam lying in the plane of said projecting portions of said actuator and oscillatable in said plane about an axis longitudinally eccentric to the center of said elongated cam and transverse to the path of movement of said actuator, means for connecting said structure in driving relation with the tuning element of a radio receiver, and means for moving said actuator toward said structure to cause said projecting portions of said actuator to contact and push alternative adjacent edges of said cam and to cause said actuator to apply a moving force to said structure and rotate it to a position in which the longitudinal axis of said elongated cam projects away from said actuator in substantial alignment therewith and in which said actuator is in engagement with said structure on both sides of its rotational axis.

19. In a mechanism for positioning a control of a radio device, a combination including: a rotatable shaft; a positionable structure adjustably mounted upon said shaft and comprising a plurality of peripheral cam face portions each extending in a direction away from said shaft; positioning means for turning said structure in either direction to a position in which said means presses on said structure on opposite sides of its rotational axis simultaneously and in substantially parallel directions; said positioning means adapted to rotate said structure in opposite directions solely by the application of pressure to said cam portions from totally different portions of said means, and having a first shoulder adapted to engage and turn said structure in one direction only and a second shoulder adapted to engage and turn said structure in the opposite direction only, said means having a recess between said shoulders to permit said shoulders to pass over at least part of said structure.

20. In a mechanical station selector type tuner for a radio receiver, means for rotating a control shaft in either direction through an angle of less than 180 degrees, said means including, in combination: an actuator movable generally rectilinearly and having a recess in its forward end bordered by spaced forwardly projecting portions on opposite sides thereof, an elongated generally flat peripheral cam positioned in front of said actuator and lying in the plane of said projecting portions of said actuator, means for supporting said cam for oscillation in said plane about an axis longitudinally eccentric to the center of said elongated cam and transverse to the path of movement of said actuator and with the outermost end of said cam facing generally away from said actuator and never directly toward the same, means for connecting said cam in driving relation with said control shaft, and means for moving said actuator toward said cam to cause said projecting portions of said actuator to contact alternative adjacent edges of said cam and push the same around to a position in which the longitudinal axis of said elongated cam projects away from said actuator in substantial alinement therewith.

LE ROY J. LEISHMAN.